US012500381B2

(12) United States Patent
Chen et al.

(10) Patent No.: US 12,500,381 B2
(45) Date of Patent: Dec. 16, 2025

(54) CARD EDGE CONNECTOR WITH AN IMPROVED METAL SHELL

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Po-Fu Chen, New Taipei (TW); Kuo-Chun Hsu, New Taipei (TW); Ta-Lung Liu, New Taipei (TW); Ming-Xiang Chen, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 342 days.

(21) Appl. No.: 18/122,325

(22) Filed: Mar. 16, 2023

(65) Prior Publication Data

US 2023/0299541 A1 Sep. 21, 2023

(30) Foreign Application Priority Data

Mar. 16, 2022 (CN) ........................ 202210261011.X

(51) Int. Cl.

*H01R 13/658* (2011.01)
*H01R 12/70* (2011.01)
*H01R 12/72* (2011.01)
*H01R 13/6581* (2011.01)

(52) U.S. Cl.

CPC ..... *H01R 13/6581* (2013.01); *H01R 12/7005* (2013.01); *H01R 12/721* (2013.01)

(58) Field of Classification Search

CPC . H01R 13/6581; H01R 12/005; H01R 12/721
USPC .................................................... 439/607.54
See application file for complete search history.

(56) References Cited

U.S. PATENT DOCUMENTS

| | | | | | |
|---|---|---|---|---|---|
| 7,682,179 | B1 * | 3/2010 | Tsai | H01R 12/7005 | 439/328 |
| 10,566,717 | B2 | 2/2020 | Fit | | |
| 2010/0062624 | A1 * | 3/2010 | Tsai | H05K 7/16 | 439/74 |
| 2013/0344734 | A1 * | 12/2013 | Yokoyama | H01R 12/7011 | 439/569 |

(Continued)

FOREIGN PATENT DOCUMENTS

| | | | | | |
|---|---|---|---|---|---|
| CN | 1227432 | A | * | 9/1999 | |
| CN | 1819363 | A | * | 8/2006 | H01R 13/62938 |

(Continued)

*Primary Examiner* — Peter G Leigh
(74) *Attorney, Agent, or Firm* — Ming Chieh Chang

(57) ABSTRACT

A card edge connector includes: an insulating housing defining a card slot opening forwards through a front face thereof; plural terminals retained in the insulating housing and including contacting portions extending into the card slot and soldering portions exposed upon a bottom face of the housing; and a metal shell at least partially covering the insulating housing, wherein the metal shell including a flat plate and a pair of side plates bending downwards from the flat plate, and the flat plate is at least partially embedded in the insulating housing and located proximate to a top face.

13 Claims, 18 Drawing Sheets

(56) References Cited

U.S. PATENT DOCUMENTS

2019/0044266 A1* 2/2019 Xu .................... H01R 12/7005

FOREIGN PATENT DOCUMENTS

| | | | | | |
|---|---|---|---|---|---|
| CN | 106415921 B | * | 11/2019 | | H01P 1/2053 |
| CN | 212970637 U | * | 4/2021 | | |
| CN | 213782404 U | * | 7/2021 | | H01R 13/502 |
| CN | 214849251 U | * | 11/2021 | | |
| CN | 215579364 U | * | 1/2022 | | |
| DE | 10354286 A1 | * | 7/2004 | | H01R 11/12 |

* cited by examiner

CARD EDGE CONNECTOR WITH AN IMPROVED METAL SHELL

BACKGROUND OF THE INVENTION

Field of the Invention

The present invention relates to a card edge connector, and particularly to a card edge connector with an improved metal shell.

Description of Related Arts

China Patent No. 107666043 discloses a card edge connector including an insulating housing, a plurality of terminals retained in the insulating housing, and a shell covering the insulating housing. The insulating housing defines a slot going through a front face thereof to receive an electrical card. The terminal includes a contacting portion extending into the slot and a tail extending out of the insulating housing. The insulating housing has a retaining wall above the slot. The card edge connector further includes a nut retained in the retaining wall, and cooperating with an external retaining member to fix the heat dissipation module to the insulating housing. However, the shell or the nut needs to be assembled to the insulating housing, which increases the process steps.

Therefore, it is desired to provide a new card edge connector.

SUMMARY OF THE INVENTION

An object of the present invention is to provide a card edge connector with an improved metal shell.

To achieve the above-mentioned object, a card edge connector comprises: an insulating housing defining a card slot opening forwards through a front face thereof; a plurality of terminals retained in the insulating housing and comprising contacting portions extending into the card slot and soldering portions exposed upon a bottom face of the housing; and a metal shell at least partially covering the insulating housing, wherein the metal shell comprises a flat plate and a pair of side plates bending downwards from the flat plate, and the flat plate is at least partially embedded in the insulating housing and located proximate to a top face.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
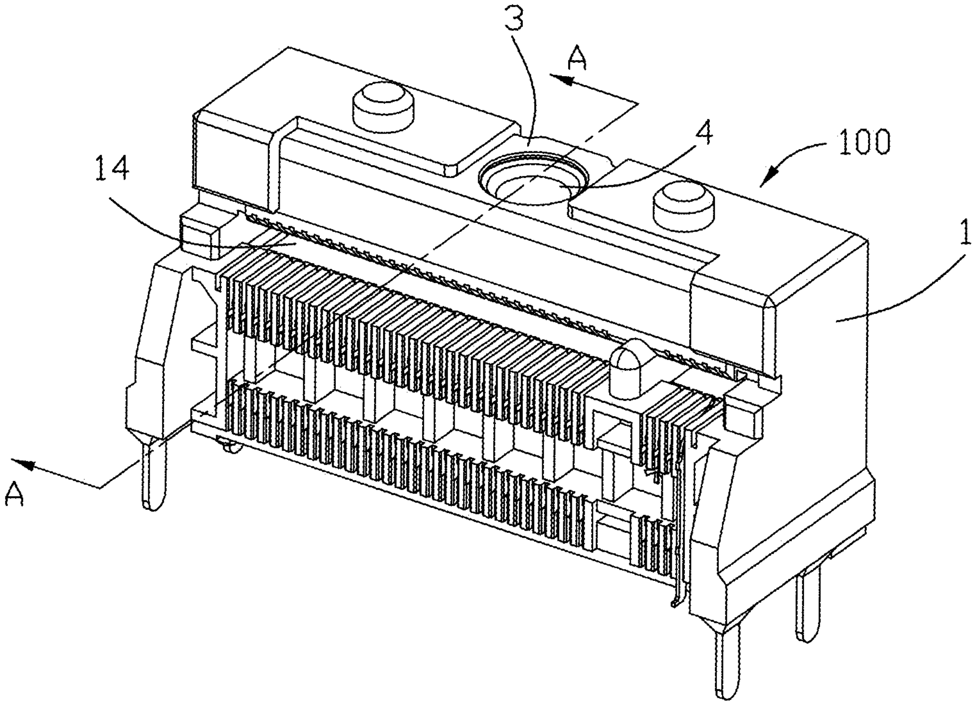
FIG. 1 is a perspective view of a card edge connector according to a first embodiment of the present invention.
Figure 2:
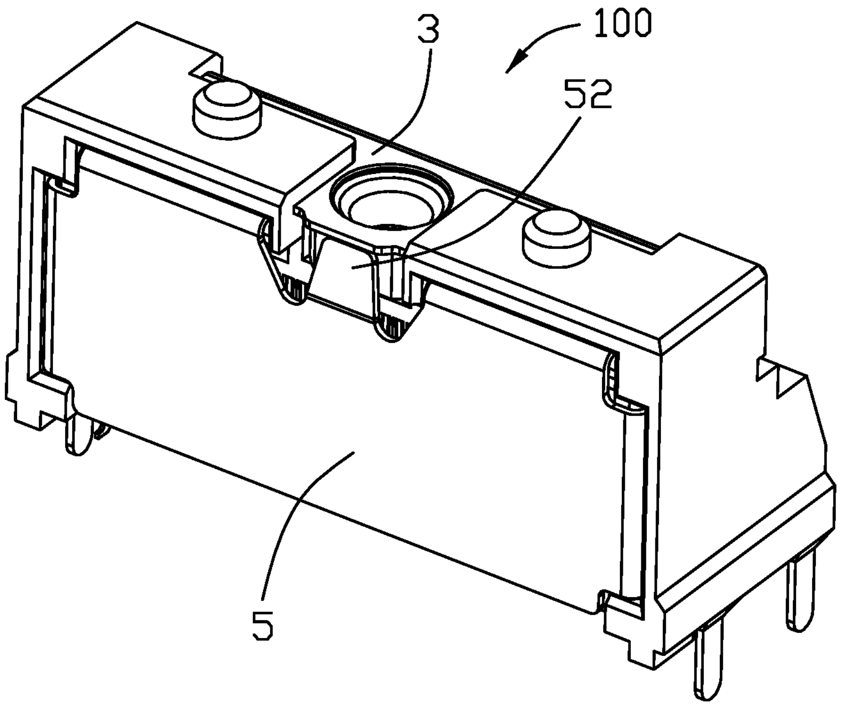
FIG. 2 is another perspective view of the card edge connector in FIG. 1.
Figure 3:
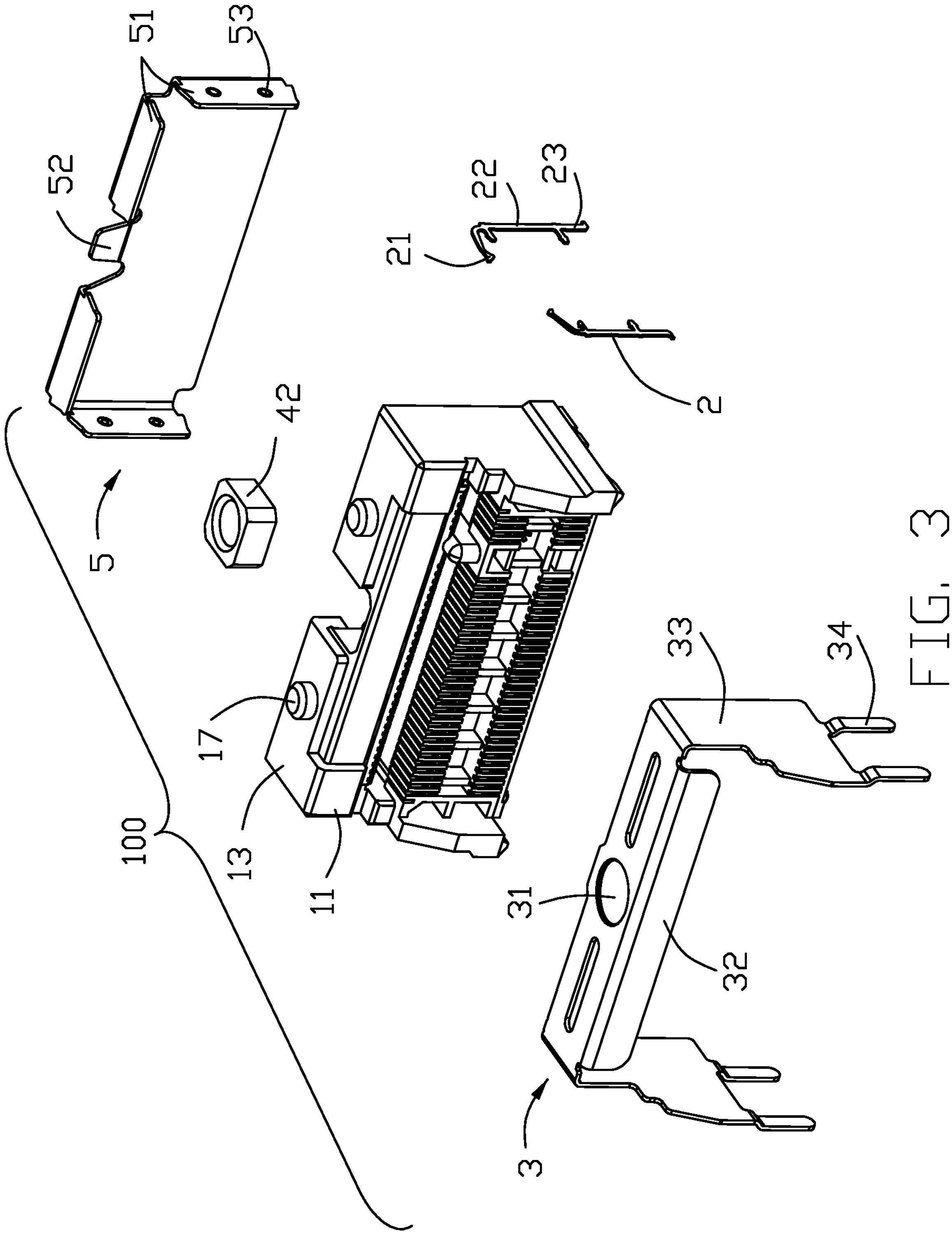
FIG. 3 is an exploded view of the card edge connector in FIG. 1.
Figure 4:
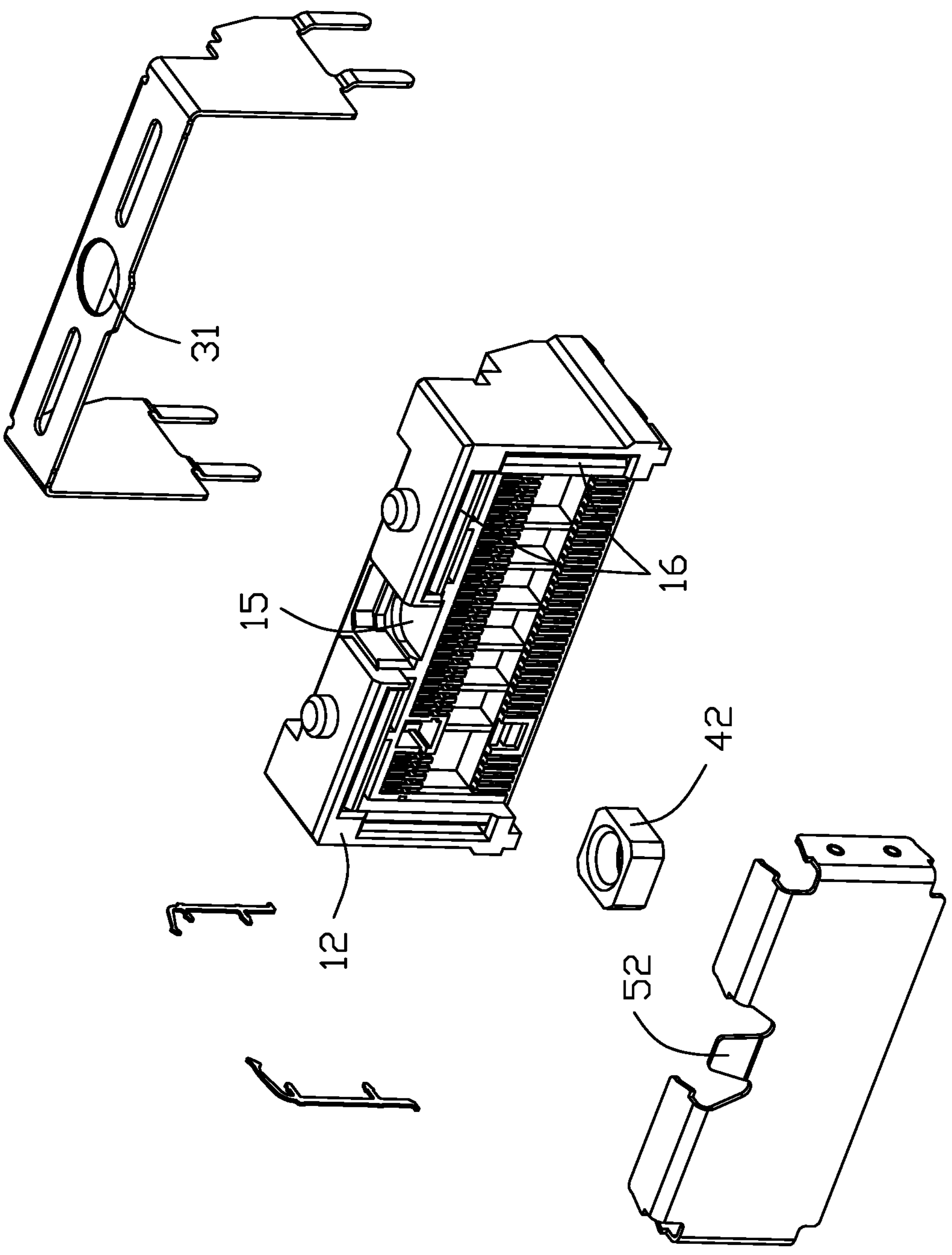
FIG. 4 is another exploded view of the card edge connector in FIG. 3.
Figure 5:
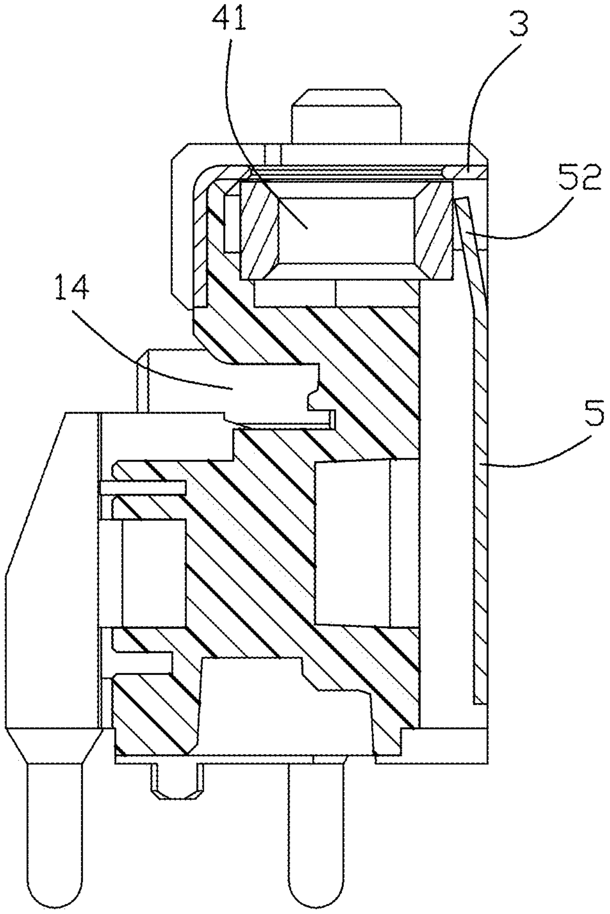
FIG. 5 is a cross-sectional view of the card edge connector taken along line A-A in FIG. 1.
Figure 6:
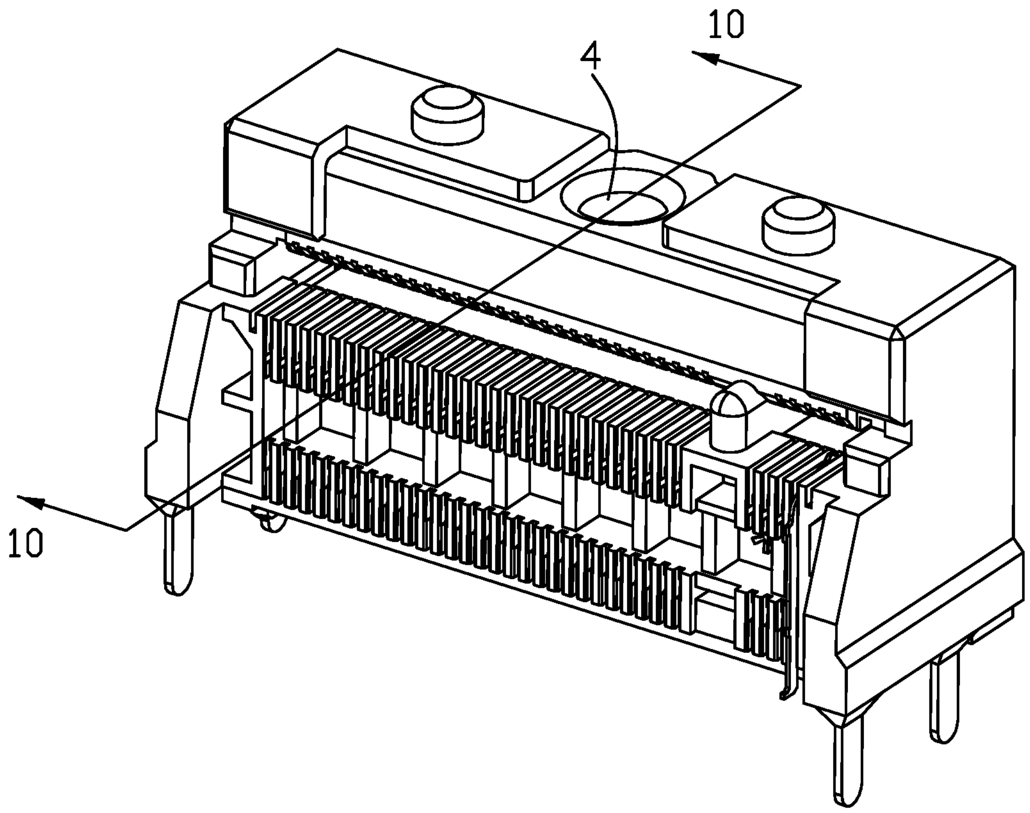
FIG. 6 is a perspective view of a card edge connector according to a second embodiment of the present invention.
Figure 7:
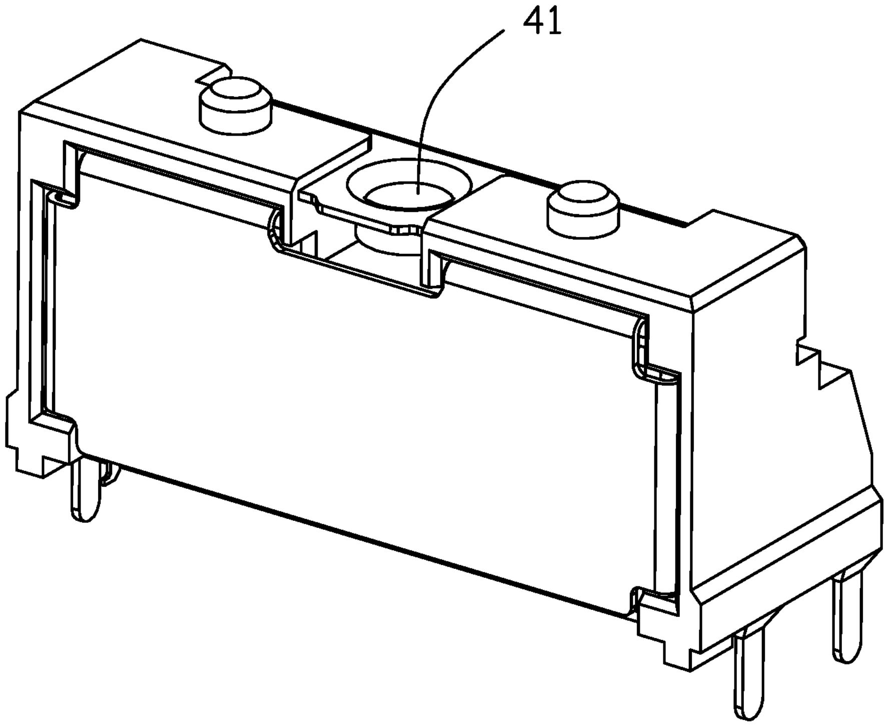
FIG. 7 is another perspective view of the card edge connector in FIG. 6.
Figure 8:
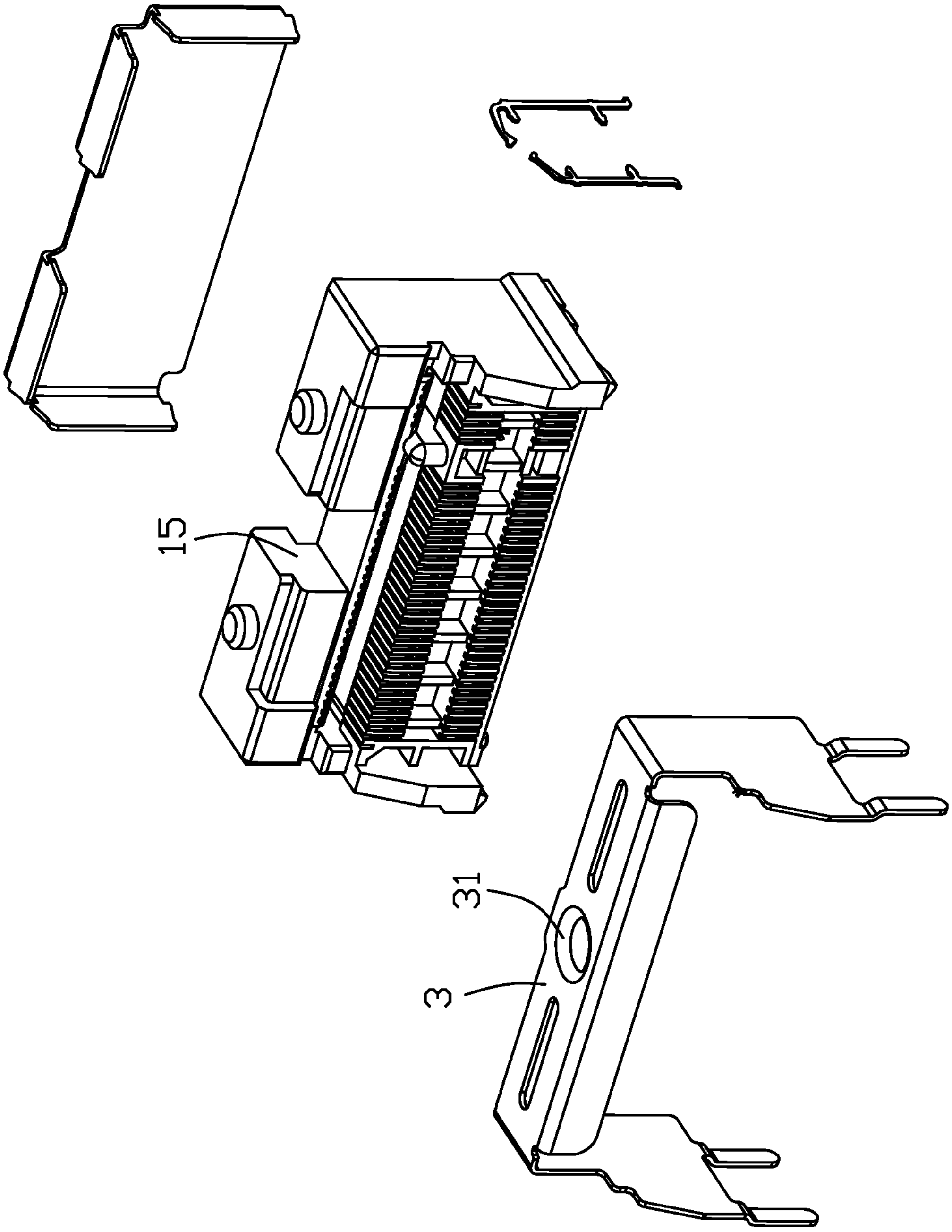
FIG. 8 is an exploded view of the card edge connector in FIG. 6.
Figure 9:
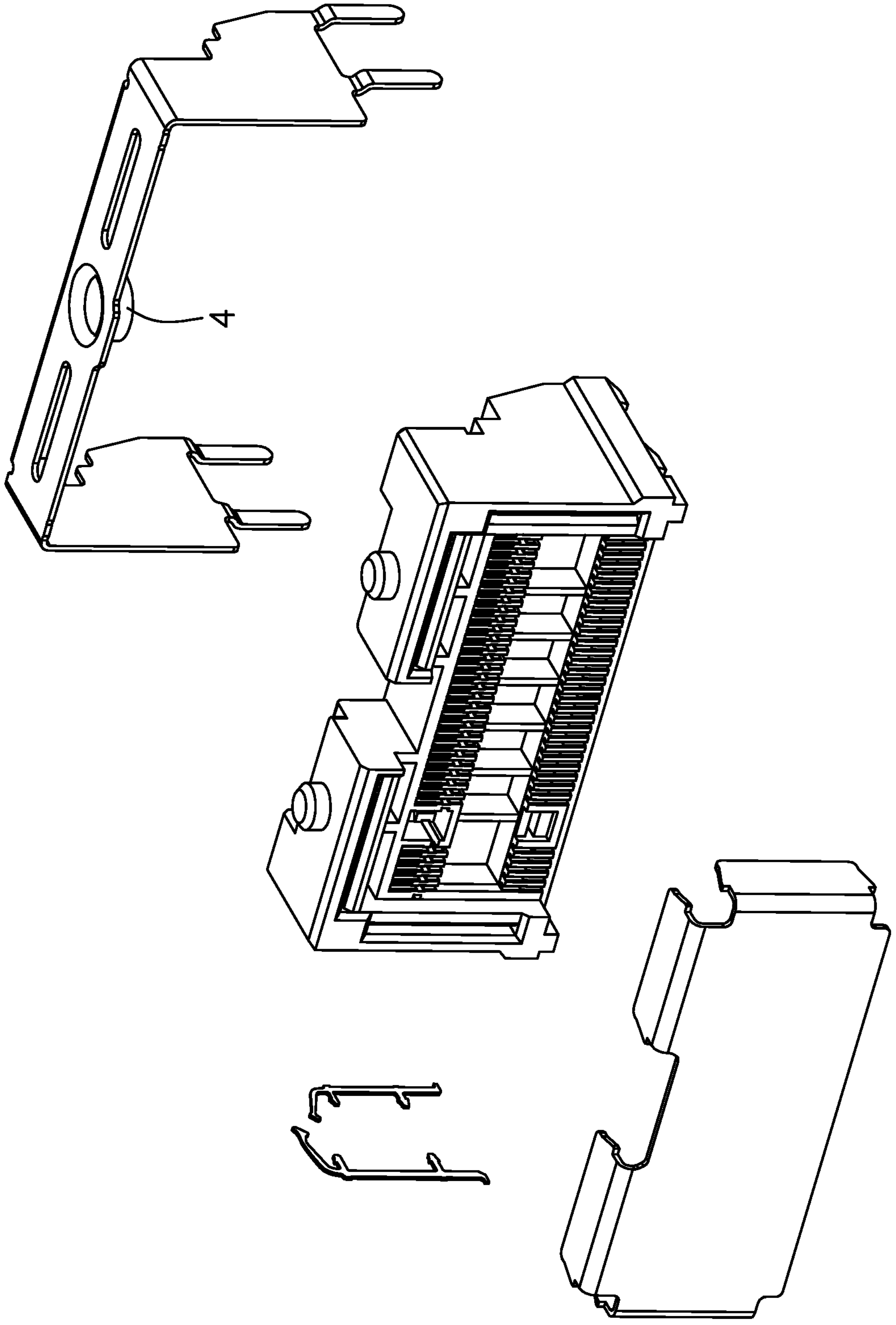
FIG. 9 is another exploded view of the card edge connector in FIG. 8.
Figure 10:
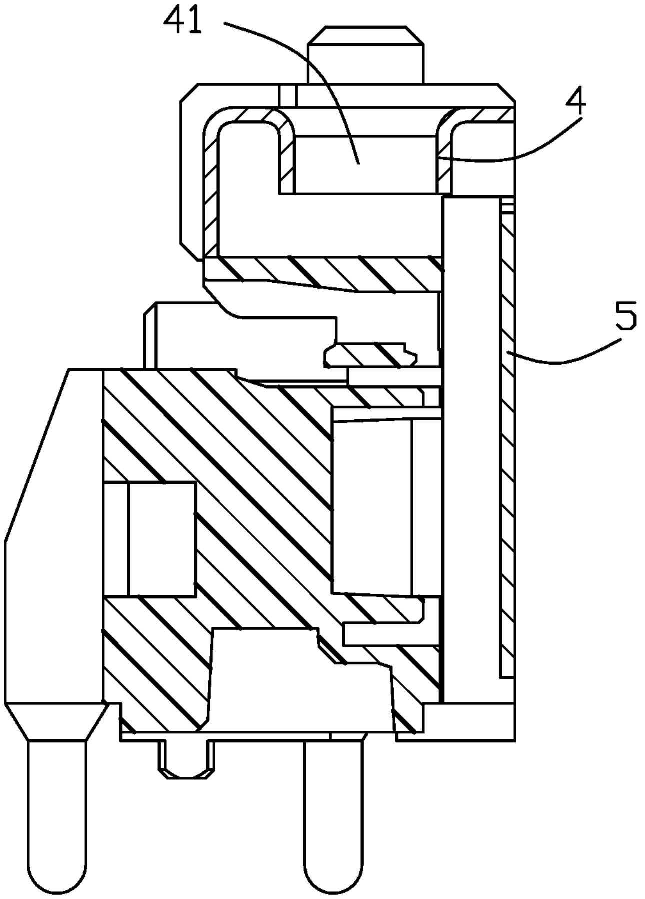
FIG. 10 is a cross-sectional view of the card edge connector taken along line 10-10 in FIG. 6.

FIGS. 1-5 show a first embodiment of a card edge connector 100. The card edge connector 100 includes an insulating housing 1 and a plurality of conductive terminals 2 retained in the insulating housing 1. The insulating housing 1 defines a front face 11 and a rear face 12 opposite to the front face 11, a top face 13 between the front and rear faces, and a card slot 14 opening through the front face 11 forwards. The terminal 2 include a contacting portion 21 extending into the card slot 14, a fixing portion 22 retained in the insulating housing 11, and a leg portion 23. The card edge connector 1 further includes a flat plate 3 and a locking member 4 retained in the insulating housing 1. The locking member 4 defines a hole 41 penetrating along an upright direction. The flat plate 3 defines an opening 31 corresponding to the hole 41 of the locking member 4. The flat plate 3 prevents an upward movement of the locking member 4. The flat plate 3 is embedded in the insulating housing 1 to ensure a holding stability of the flat plate 3 and the insulating housing 1.

The insulating housing 1 defines a receiving cavity 15 opens through the top face 13 thereof. The locking member 4 is located in the receiving cavity 15. In this embodiment, the receiving cavity 15 also opens through the rear face 12 of the insulating housing 1. The card edge connector 100 includes a rear plate 5 covering the rear face 12 of the insulating housing 1. The rear plate 5 has a fixing portion 51 bending forwards from side edges thereof. The fixing portions 51 are retained in the insulating housing 1. The flat plate 3 is located below the top face 13. The opening 31 of the flat plate 3 is exposed upon the top face 13 and is located in the middle of the top face 13. A pair of limiting portions 17 protrudes upward from the top face 13 and is located on two sides of the opening 31. The limiting portions 17 are of a cylindrical post in this embodiment. A front plate 32 bends downwards from a front edge of the flat portion, longitudinal ends of the front plate 32 are embedded in the insulating housing 1, and the rest of the front plate 32 is exposed upon the front face of the insulating housing 1. In this embodiment, the rear plate 5 and the flat plate 3 are discrete from each other. The flat plate 3 is embedded in the housing when the insulating housing 1 is formed by injection molding, and the rear plate 5 is assembled to the insulating housing 1.

In this embodiment, the locking member 4 is in a type of a nut 42. The nut 42 is fixed in the receiving cavity 15, and the nut 42 protrudes rearward beyond the rear face 12 of the insulating housing 1. The rear plate 5 has a resisting elastic arm 52 for resisting the nut 42, and the resisting elastic arm 52 presses forward against a rear end of the nut 4. A pair of side plates 33 bends downwards from the side edges of the flat plate 3. The flat plate 3 and the side plates 33 are embedded in the insulating housing 1. The side plates 33 extend downwards to form a tail 34. Each side plate 33 has two tails 34. The rear plate 5 also has two fixing portions 51 extending forwards and fixed in the insulating housing 1 at an upper edge thereof. In the embodiment, the rear plate 5 has a total of four fixing portions. The insulating housing 1 defines a receiving recess 16 to receive the four fixing portions 51. In this embodiment, the fixing portions 51 located on both sides of the rear plate 5 have two bosses 53. The bosses 53 abut against the side plates 33 to establish an electrical connection between the flat plate 3 and the rear plate 5.

Referring to FIGS. 3-10, a card edge connector of a second embodiment of the present invention is shown, which has a basically same construction as the first embodiment, and differences will be described hereinafter. The locking member 4 extends integrally downward from the flat plate 3, that is, the locking member 4 extends integrally downward from the inner edge of the opening 31 of the flat plate 3 to form a hole 41. The inner face of the hole 41 is tapped to form an internal thread (not shown), allowing the hole 41 to lock an external bolt. The receiving cavity 15 penetrates upwards through the top face of the insulating housing 1. In this embodiment, the flat plate 3 and the rear plate 5 are arranged separately and the rear plate 5 does not set the bosses. The locking member 4 is an integral structure with the flat plate 3. In the second embodiment, the locking member 4 is integrated with the flat plate 3, which reduces the number of parts and process steps, and effectively reduces the cost and unit production time. The flat plate and the rear plate are constructed as a metal shell.

Figure 11:
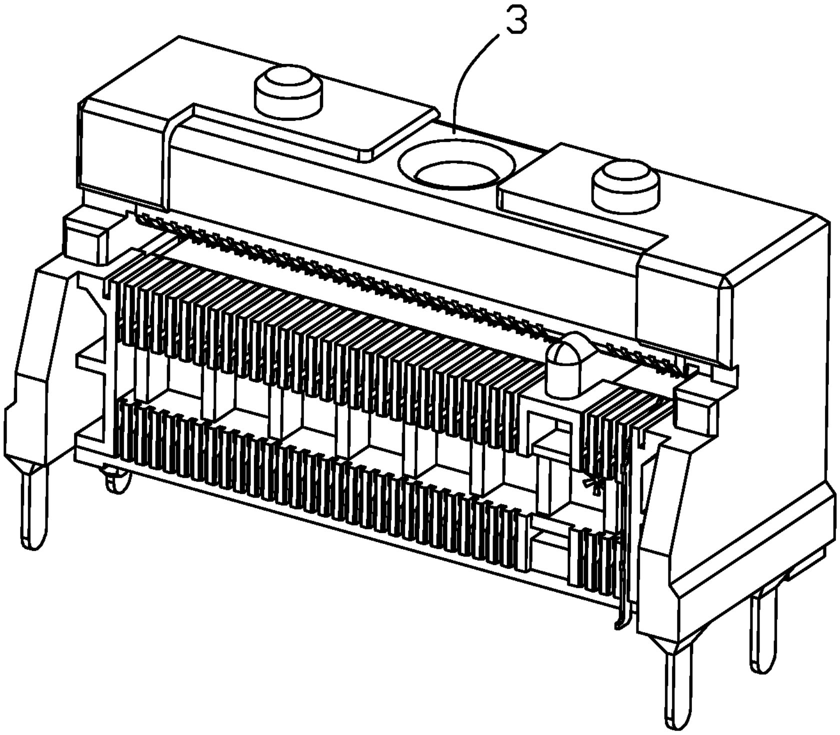
FIG. 11 is a perspective view of a card edge connector according to a third embodiment of the present invention.
Figure 12:
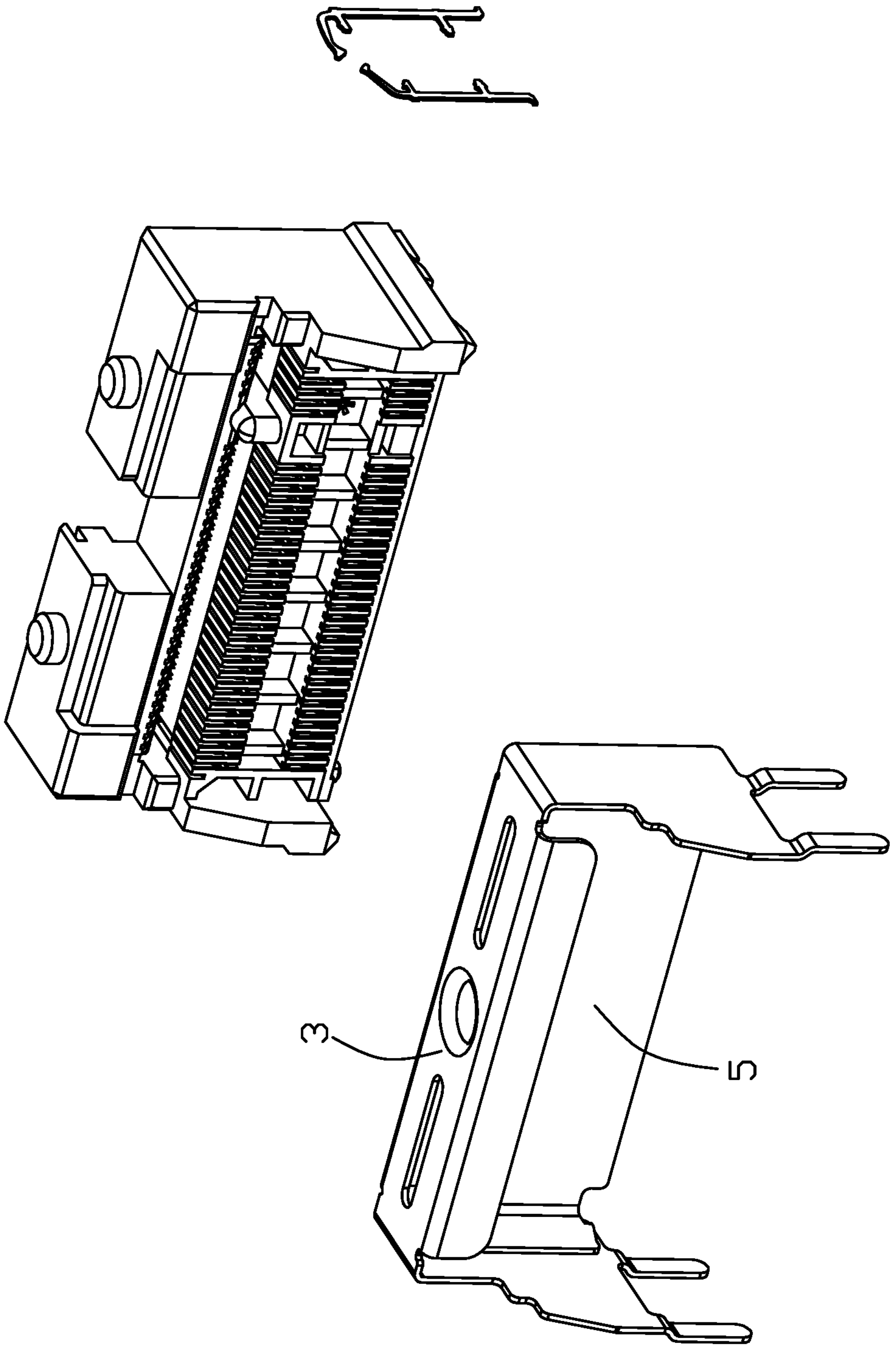
FIG. 12 is an exploded view of the card edge connector in FIG. 11.

Referring to FIGS. 11-12, a card edge connector of a third embodiment of the present invention is shown, which is similar to the second embodiment. The locking member is an integrated structure with the flat plate. The difference is that the rear plate 5 is formed by bending downwards from the rear edge of the flat plate 3. The flat plate 3 is embedded in the insulating housing 1, and the rear plate 5 is fixed to the insulating housing 1.

Figure 13:
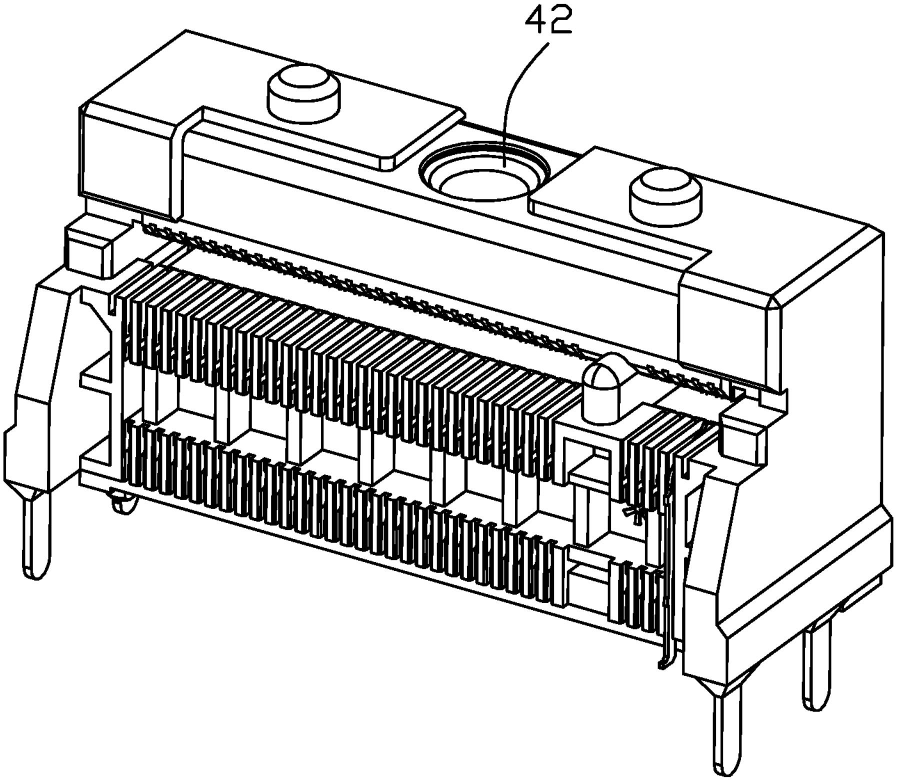
FIG. 13 is a perspective view of a card edge connector according to a fourth embodiment of the present invention.
Figure 14:
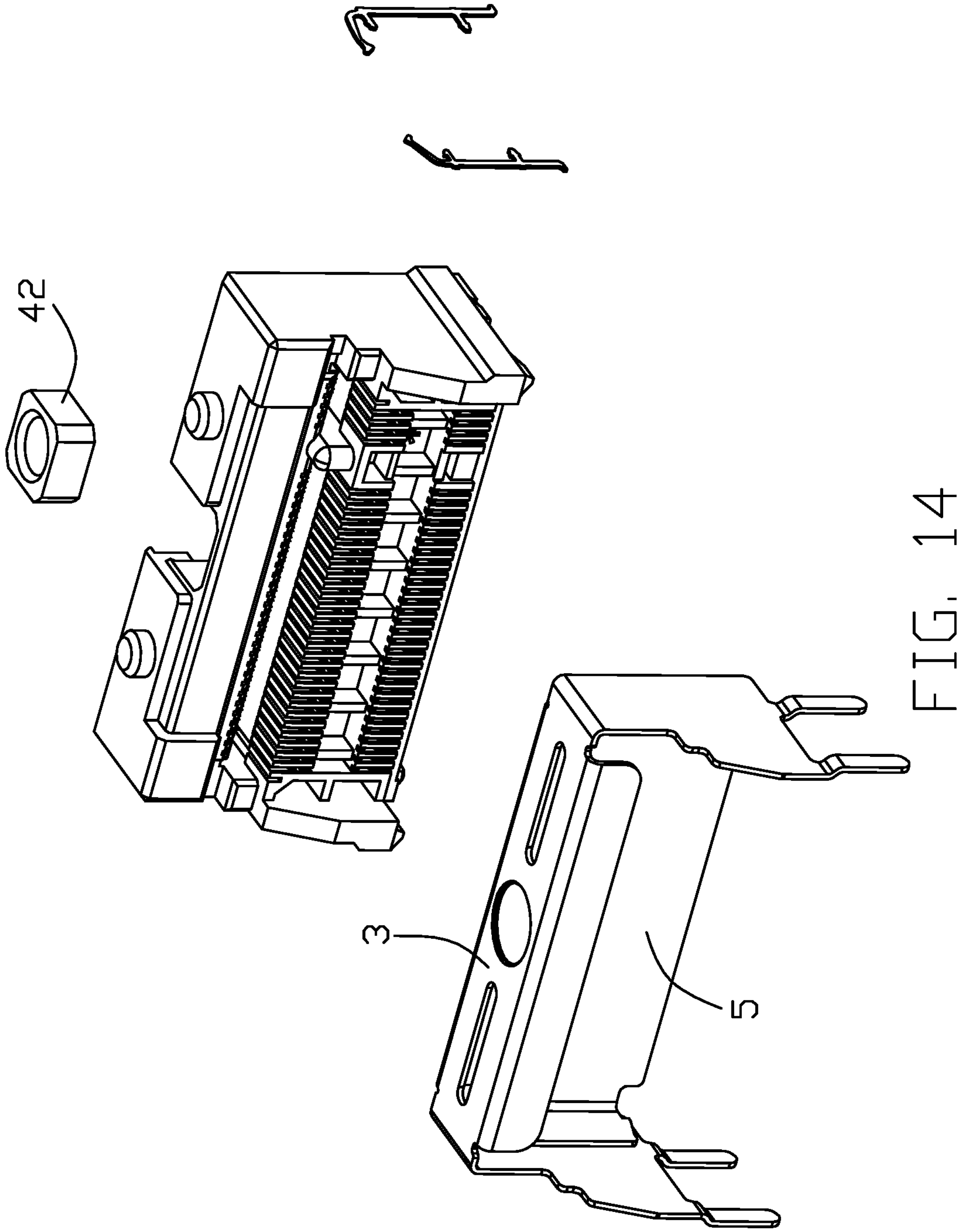
FIG. 14 is an exploded view of the card edge connector in FIG. 13.
Figure 15:
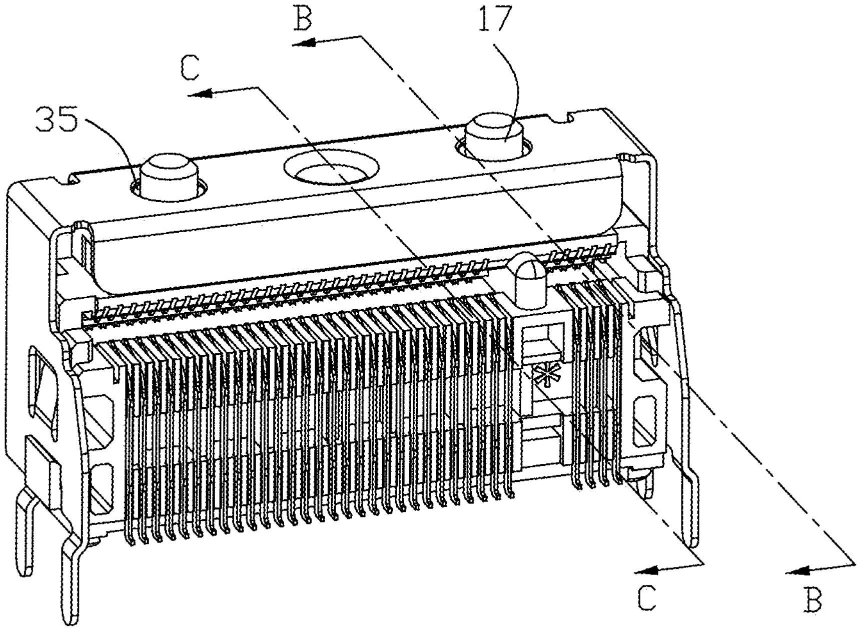
FIG. 15 is a perspective view of a card edge connector according to a fifth embodiment of the present invention.
Figure 16:
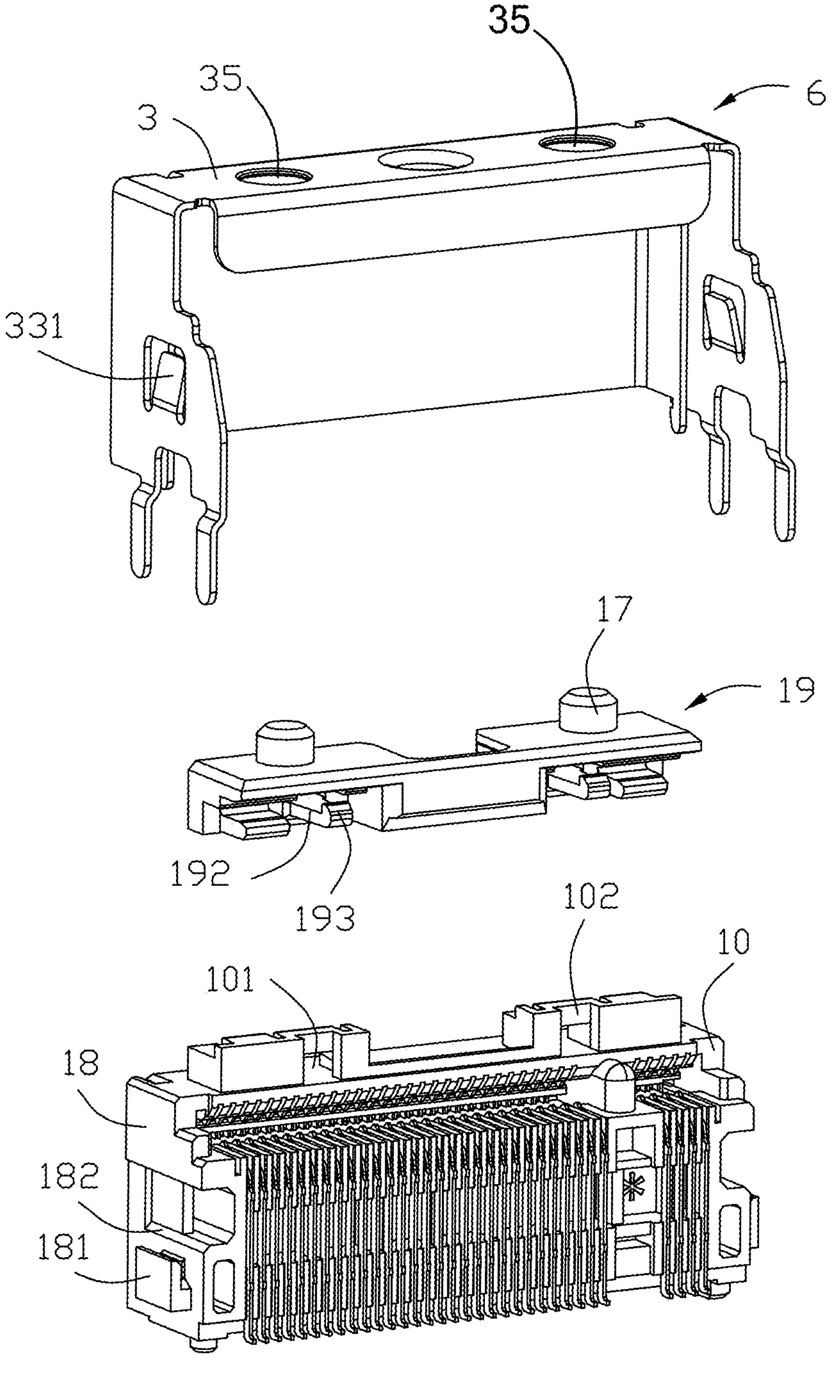
FIG. 16 is an exploded view of the card edge connector in FIG. 15.
Figure 17:
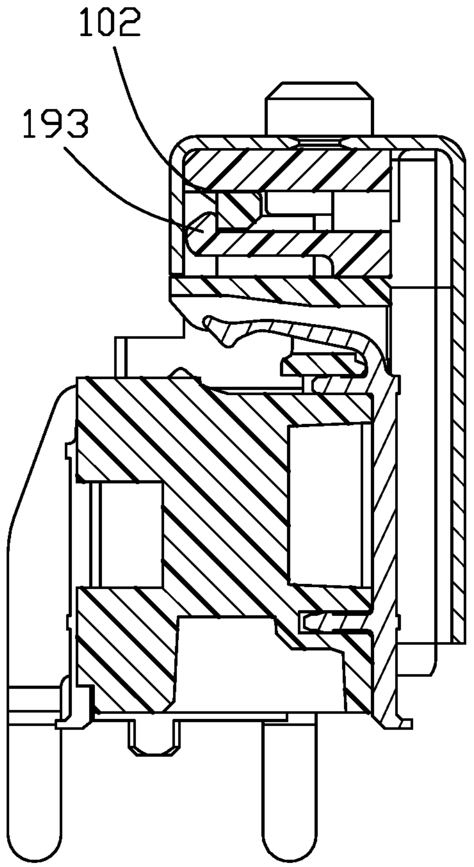
FIG. 17 is a cross-sectional view of the card edge connector taken along line B-B in FIG. 15.
Figure 18:
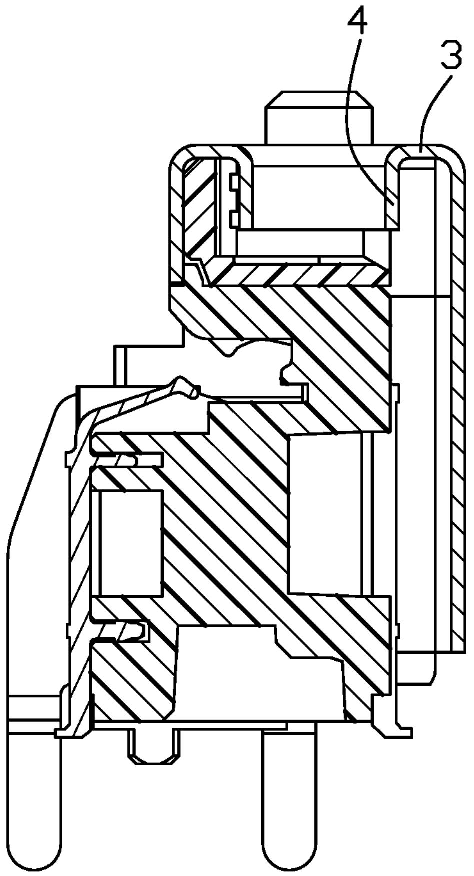
FIG. 18 is a cross-sectional view of the card edge connector taken along line C-C in FIG. 15.

Referring to FIGS. 13-14, a card edge connector of a fourth embodiment of the present invention is shown, which is similar to the third embodiment. The rear plate 5 is an integral structure with the flat plate 3, and the difference is that the locking member 4 is a nut 42.

Referring to FIGS. 15-18, a card edge connector of a fifth embodiment of the present invention is shown. The metal shell 6 covering the insulating housing. The flat plate 3 of the metal shell is attached to the top face of the insulating housing, and a pair of side plates 33 bending downwards from two sides of the flat plate 3. The flat plate 3 defines an opening 31. A locking member 4 extends upright from the inner edge of the opening 31. In this embodiment, the locking member 4 extends downwards from the flat plate 3 integrally, and has an internally threaded hole (not shown in the figure), so as to cooperate with an external bolt. The insulating housing 1 defines a receiving cavity 15 penetrating upwards through the top face thereof. The locking member 4 is received in the receiving cavity 15. The insulating housing 1 has two side faces 18. Each side face 18 has a mounting portion 181 and a limiting recess 182 above the mounting portion 181. The bottom edge of the side plate 33 of the shell 6 is clamped to the mounting portion 181. The side plate 33 has a limiting tab 331 bending inwardly, and the limiting tab 331 abuts against the limiting recess 182 to prevent the cover member 6 from loosening in the vertical direction. The insulating housing 1 includes a first insulating housing 10 and a second insulating housing 19 mounted on the top of the first insulating housing 10. The flat plate 3 defines a pair of through holes 35. Two limiting portions 17 protrude upwards from the second insulating housing and pass through the through holes 35 to form the limiting post. The second insulating housing 19 includes a base portion 191. The limiting portion 17 extends upwards from the base portion 191, and the base portion 191 has the receiving cavity 15. An elastic locking arm 192 extends forwards from the base portion 191. The first insulating housing 10 defines a locking slot 101 to receive the elastic locking arm 192. The locking slot 101 goes through the first insulating housing 10 along a front-to-back direction, and has a locking notch 102 penetrating upwards at the front end. The elastic locking arm 192 protrudes upwards from a free end thereof to form a locking protrusion 193. The locking protrusion 193 is engaged with the front end face of the locking notch 102.

The above-mentioned embodiments are only preferred embodiments of the present invention, and should not limit the scope of the present invention, any simple equivalent changes and modifications made according to the claims of the present invention and the contents of the description should still belong to the present invention.

The invention claimed is:

1. A card edge connector comprising:
- an insulating housing defining a card slot opening forwards through a front face thereof;
- a plurality of terminals retained in the insulating housing and comprising contacting portions extending into the card slot and soldering portions exposed to a bottom face of the housing; and
- a metal shell at least partially covering the insulating housing;
- wherein the metal shell comprises a flat plate and a pair of side plates bending downwards from the flat plate, and the flat plate is at least partially embedded in the insulating housing and located proximate to and under a top face of the insulating housing.

2. The card edge connector as claimed in claim 1, further comprising a locking member with a threaded hole, and wherein the flat plate defines an opening exposed at the top face of the insulating housing, the locking member is retained in the insulating housing and below the flat plate, and the threaded hole corresponds to the opening of the flat plate.

3. The card edge connector as claimed in claim 2, wherein the insulating housing defines a receiving cavity opening upwards, and the locking member is received in the receiving cavity.

4. The card edge connector as claimed in claim 3, wherein the locking member is a nut discrete from the flat plate.

5. The card edge connector as claimed in claim 4, wherein the receiving cavity opens rearwards and seals frontwards.

6. The card edge connector as claimed in claim 4, wherein the metal shell further comprises a front plate bending downward from a front edge of the flat plate and located above the card slot.

7. The card edge connector as claimed in claim 6, wherein the metal shell further comprises a rear plate discrete from the flat plate, and the rear plate is assembled to the insulating housing.

8. The card edge connector as claimed in claim 2, wherein the locking member integrally extends vertically from an inner edge of the opening of the flat plate.

9. The card edge connector as claimed in claim 1, wherein the side plates are embedded in the insulating housing and parallel to opposite sides of the insulating housing.

10. A card edge connector comprising:

an insulating housing defining a card slot opening forwards through a front face thereof;

a plurality of terminals retained in the insulating housing and comprising contacting portions extending into the card slot;

a metal shell retained with the insulating housing, the metal shell having a flat plate parallel to the top face of the insulating housing and a pair of side plates bending downwards from the flat plate and covering opposite side faces of the insulating housing, the flat plate having an opening and two through holes; and a locking member disposed in the insulating housing and having a threaded hole upright extending and aligned with the opening of the flat plate; wherein the locking member is formed by a downward drawing operation of the flat plate, and the insulating housing defines two limiting portions protruding upwards from the top face of the insulating housing and positioned in corresponding through holes.

11. The card edge connector as claimed in claim 10, wherein the insulating housing defines a receiving cavity opening upwards and the locking member is received in the receiving cavity.

12. The card edge connector as claimed in claim 10, wherein the metal shell further comprises a front plate bending downward from a front edge of the flat plate, and the front plate covers a front face of the insulating housing and is located above the card slot.

13. The card edge connector as claimed in claim 12, wherein the metal shell further comprises a rear plate bending downward from a rear edge of the flat plate, and the rear plate covers a rear face of the insulating housing.

* * * * *